(12) United States Patent
Brookins et al.

(10) Patent No.: US 6,840,878 B2
(45) Date of Patent: Jan. 11, 2005

(54) IDLER ASSEMBLY FOR A SANDING/POLISHING DEVICE

(75) Inventors: Tracy A. Brookins, Warsaw, IN (US); Daniel F. Knepper, Warsaw, IN (US); David A. Smoker, Leesburg, IN (US); Daniel S. O'Neil, Warsaw, IN (US); Steven P. Miller, Leesburg, IN (US)

(73) Assignee: DePuy Products, Inc., Warsaw, IN (US)

( * ) Notice: Subject to any disclaimer, the term of this patent is extended or adjusted under 35 U.S.C. 154(b) by 110 days.

(21) Appl. No.: 10/327,768

(22) Filed: Dec. 23, 2002

(65) Prior Publication Data

US 2004/0121866 A1 Jun. 24, 2004

(51) Int. Cl.[7] .............................. F16H 7/08; F16H 7/22; F16H 61/06
(52) U.S. Cl. ............................ 474/110; 474/5; 474/101
(58) Field of Search ........................... 474/5, 101, 109, 474/110, 103–104, 133, 135, 138; 92/24, 130 R, 134, 137; 251/31, 38

(56) References Cited

U.S. PATENT DOCUMENTS

| | | | |
|---|---|---|---|
| 3,772,927 A | * 11/1973 | Bertin | 474/5 |
| 4,003,547 A | * 1/1977 | Snyder et al. | 251/31 |
| 4,094,205 A | 6/1978 | Cook | |
| 4,257,219 A | 3/1981 | Burrough et al. | |
| 4,294,044 A | 10/1981 | Hansen | |
| 4,458,318 A | 7/1984 | Smit et al. | |
| 4,545,298 A | 10/1985 | Viaud | |
| 4,597,746 A | * 7/1986 | Goscenski, Jr. | 474/62 |
| 4,718,308 A | 1/1988 | Haley | |
| 5,071,316 A | 12/1991 | Diem et al. | |
| 5,088,240 A | 2/1992 | Ruble et al. | |
| 5,105,925 A | * 4/1992 | Tremaglio et al. | 474/110 |
| 5,176,581 A | 1/1993 | Kumm | |
| 5,951,377 A | 9/1999 | Gorg et al. | |

FOREIGN PATENT DOCUMENTS

| | | | | |
|---|---|---|---|---|
| DE | 3905219 A1 | * 4/1990 | | F16H/7/10 |
| DE | 4113593 C2 | * 11/1995 | | C02F/1/40 |
| EP | 0673689 A1 | * 9/1995 | | B21C/1/10 |
| FR | 2567093 A1 | * 1/1986 | | B62D/55/30 |
| RU | 2075279 C | * 3/1997 | | A01D/41/00 |

* cited by examiner

Primary Examiner—Marcus Charles
(74) Attorney, Agent, or Firm—Maginot Moore & Beck (57) ABSTRACT

An idler or tensioning assembly for an electronically controlled sanding/polishing machine is provided, the sanding/polishing machine utilizing a plurality of exchangeable polishing wheel assemblies of which the idler assembly is one. Each polishing wheel assembly interfaces with the sanding/polishing machine through a coolant manifold and a polishing wheel shaft receptor. The idler assembly is operative to provide releasable tension to a sanding/polishing belt that is situated around the idler and the associated sanding/polishing wheel. The idler assembly has a pivoting idler that is actuated by a hydraulic cylinder. The hydraulic cylinder utilizes coolant tapped from the coolant manifold of the idler assembly for actuation. Coolant is provided to the hydraulic cylinder in response to a valve signal. The idler assembly thus has a tensioned mode and an untensioned mode.

17 Claims, 8 Drawing Sheets

IDLER ASSEMBLY FOR A SANDING/POLISHING DEVICE

BACKGROUND

1. Field of the Invention

The present invention relates to processing devices for the manufacture of prosthetic components and, more particularly, to a tensioning apparatus for a processing assembly of a processing device for the manufacture of prosthetic components.

2. Background Information

In the manufacture of prosthetic components there are various stages where components thereof need to be sanded, polished, finished or likewise operated upon (i.e. processed). Such operations are accomplished by and/or through processing devices. In most cases, these devices are now computer or electrically controlled and thus are generally automatic in the processing of prosthetic components.

One type of processing device utilizes a wheel and an associated assembly. The wheel is utilized to sand, polish, finish and/or likewise process a prosthetic component. Particularly, the processing device includes a plurality of wheels and associated assemblies that are utilized for various prosthetic component processing purpose. The wheels and associated assemblies are automatically interchanged for various types of processing.

One type of wheel and associated assembly includes a processing belt that extends about a processing wheel and a pulley. The belt provides the processing of the prosthetic component. Therefore, the belt needs to be periodically changed. It is time consuming to accomplish belt change. During the belt changing time, prosthetic components cannot be processed. Belt change also presents other disadvantages.

In order to save time, it would thus be advantageous to speed up the time necessary to change processing belts on a wheel and associated assembly, particularly of the type described herein for use with the processing device described above. Other advantages would become evident with such a device.

It should be appreciated that it is desired to have an assembly for a processing device of the type described above that allows for faster belt change of the assembly.

It should be further appreciated that it is desired to have an assembly for a processing device of the type described above that provides a tendency toward longer belt life of the assembly.

What is therefore needed in view of the above is an assembly for a processing device that allows for faster belt change of the assembly.

What is further needed in view of the above, is an assembly for a processing device of the type described above that provides a tendency to longer belt life.

SUMMARY

The subject invention is an idler assembly that provides releasable tensioning to a processing belt of a wheel assembly of a processing machine. Particularly, the idler assembly provides releasable tensioning of a processing belt of a sanding/polishing machine.

In one form, the subject invention is a tensioning assembly having a fluid distributor adopted to be releasably coupled to a coolant system of the processing machine, the coolant system operative to selectively provide coolant to said fluid distributor, an idler arm pivotally coupled to the fluid distributor, an idler coupled for rotation to the idler arm, an actuator operatively coupled to the idler arm, and a fluid conduit in fluid communication between the fluid distributor and the actuator. The actuator having a first mode of operation and a second mode of operation. The first mode of operation providing an untensioned state to a processing belt of a processing machine via the idler. The second mode of operation providing a tensioned state to the processing belt via the idler.

In another form, there is provided an idler assembly having a manifold defining a body having an internal cavity, an outlet in fluid communication with the internal cavity, an inlet in fluid communication with the internal cavity, and a quick disconnect disposed at the inlet, the quick disconnect operative to allow the manifold and the idler assembly to be releasably attached to the processing machine and be in releasable fluid communication with a valved coolant system of the processing machine, the valved coolant system operative to selectively provide processing machine system coolant to the manifold. The idler assembly also includes an idler, an idler arm pivotally coupled at a first end to the manifold and coupled at a second end to the idler, an actuator coupled to the idler arm, and a conduit coupled to the outlet of the manifold and the actuator and providing fluid communication between the manifold and the actuator. The actuator has a first state corresponding to the absence of coolant being provided to the manifold in response to non-activation of the valved coolant system wherein the idler via the idler arm is in an untensioned state with regard to the processing belt, and a second state corresponding to coolant being provided to the manifold in response to activation of the valved coolant system wherein the idler via the idler arm is in a tensioned state with regard to the process belt.

In another form, the subject invention provides a wheel assembly for coupling to a processing machine. The wheel assembly includes a rotatable processing wheel and a processing belt situated around the processing wheel and adapted to rotate with the processing wheel when the processing belt is tensioned. The wheel assembly also includes a manifold defining a body having an internal cavity, an outlet in fluid communication with the internal cavity, an inlet in fluid communication with the internal cavity, and a quick disconnect disposed at the inlet, the quick disconnect operative to allow the manifold and the idler assembly to be releasably attached to the processing machine and be in releasable fluid communication with a valved coolant system of the processing machine, the valved coolant system operative to selectively provide processing machine system coolant to the manifold. The idler assembly further includes an idler, an idler arm pivotally coupled at a first end to the manifold and coupled at a second end to the idler, an actuator coupled to the idler arm, and a conduit coupled to the outlet of the manifold and the actuator and providing fluid communication between the manifold and the actuator. The actuator has a first state corresponding to the absence of coolant being provided to the manifold in response to non-activation of the valved coolant system wherein the idler via the idler arm is in an untensioned state with regard to the processing belt, and a second state corresponding to coolant being provided to the manifold in response to activation of the valved coolant system wherein the idler via the idler arm is in a tensioned state with regard to the process belt.

BRIEF DESCRIPTION OF THE DRAWINGS

In the drawings.

Corresponding reference characters indicate corresponding parts throughout the several views. Like reference characters tend to indicate like parts throughout the several views.

DESCRIPTION OF THE PREFERRED EMBODIMENT(S)

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention.

Figure 1:
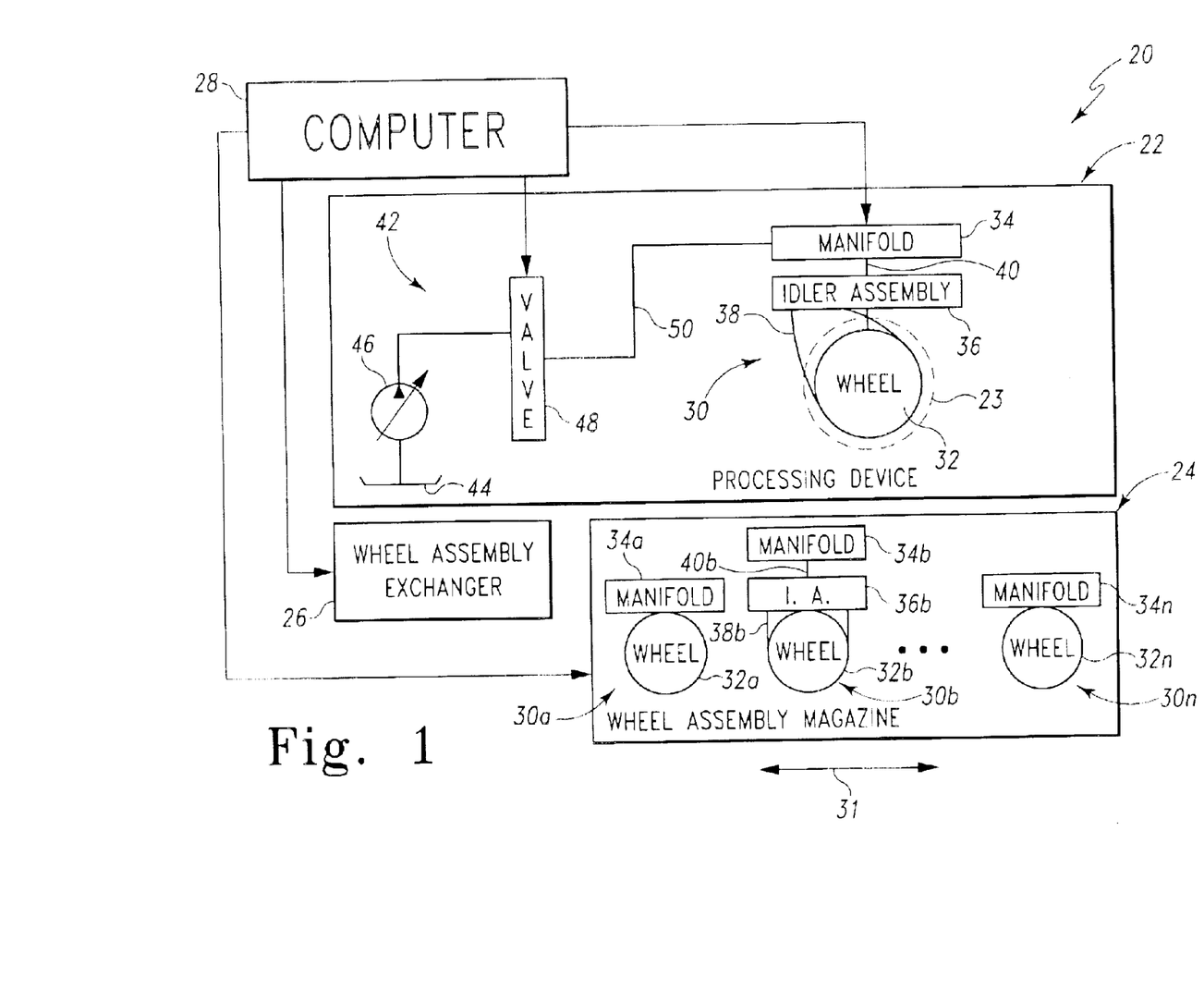
FIG. 1 is a block diagram of an exemplary sanding/polishing (processing) machine in which the present invention may be utilized.

Referring now to FIG. 1 there is shown a block diagram of an exemplary embodiment of a processing system or machine generally designated 20. The processing system 20 is generally operative, adapted and/or configured to provide sanding, polishing, finishing or otherwise like processing. While not necessarily the case, the processing system 20 is utilized in the present example for the manufacture and/or processing during manufacture of prosthetic components.

The processing system 20 has a processing machine or device 22, a wheel assembly magazine 24, a wheel assembly exchanger 26, and a computer or other similarly functioning processing unit/circuitry/logic 28. The computer 28 is coupled to and/or in communication with the processing machine 22, the wheel assembly magazine 24, and the wheel assembly exchanger 26. A respective component of the processing machine 22 may or may not provide communication back to the computer 28 as the case may or may not necessitate and/or require. The computer 28 is thus operative, adapted and/or configured to monitor and/or control the various components of the processing system 20.

The processing machine 22 is operative, adapted and/or configured to receive, retain and/or release a wheel assembly 30. The wheel assembly 30 is one of a number of wheel assemblies $30_a$ through $30_N$ that are maintained on/by the wheel assembly magazine 24 or are available for use by the processing machine 22. While the subject invention will be described with reference to the wheel assembly 30, it should be appreciated that the processing machine 22 is operative to utilize the other wheel assemblies $30_a$ through $30_N$ with or with the subject invention.

The processing machine 22 includes a motor 23 and a coolant system 42. The coolant system 42 selectively provides coolant to the various components (not necessarily shown) of the processing machine 22, including the motor 23 and/or a particular wheel assembly 30 and $30_a$ through $30_N$ utilized and/or the prosthetic component undergoing processing as necessary or required for manufacture. The motor 23 is operative, adapted and/or configured to controllably rotate a wheel 32 of the wheel assembly 30 that is coupled to a shaft (not shown). The motor 23 receives and releasably retains the wheel shaft for controlled rotation of the shaft and thus the wheel 32.

The coolant system 42 includes a coolant reservoir 44 to which a pump 46 is operatively coupled. The pump 46 is in communication with a valve 48 or other fluid control device. The valve 48 is preferably, but not necessarily, electrically actuated and thus is preferably coupled to the computer 28. The valve 48 is in communication with a connecting device 34 of the wheel assembly 30. The connecting device 34 allows the quick connection and disconnection of the wheel assembly 30 to the processing machine 22. The valve 48 has an open state and a closed state. The open state allows the flow of coolant to the connecting device 34. The closed state prevents the flow of coolant to the connecting device 34.

The wheel assembly 30 is operatively coupled to the coolant system 42 via a conduit 50 (i.e. a coolant line 50) and through a fluid distributor such as a manifold (a coolant connecting and distributing device) 34. The manifold 34 is operative, adapted and/or configured to be releasably coupled to the motor 23/processing machine 22. In accordance with a principle of the subject invention, the manifold 34 is in communication with an idler or tensioning/untensioning assembly 36 of the wheel assembly 30. The idler assembly 36 is operatively coupled to a processing belt 38 that is partially wrapped around the wheel 32. When taut (tensioned), the processing belt 38 rotates with and by the wheel 32. When loose (untensioned), the processing belt 38 is idle with respect to the wheel 32.

The idler assembly 36 is operative, adapted and/or configured to provide tensioning to the processing belt 38 when desired. Particularly, the idler assembly 36 is operatively coupled to the manifold 34 via a conduit 40 which provides an actuation mechanism for tensioning of the processing belt 38. The idler assembly 36 is operative, adapted and/or configured to utilize the coolant under pressure from the manifold 34 to provide tension to the processing belt 38. Release of coolant pressure causes the idler assembly 34 to release tension on the processing belt 38. When the idler assembly 36 tensions the processing belt 38, the processing belt 38 is rotated with and/or by the wheel 32. In this manner processing of a prosthetic component may be accomplished. When the idler assembly 36 untensions the processing belt, the processing belt is in an idle state, i.e. the processing belt 38 does not rotate with and/or by the wheel 32.

The idler assembly 36 thus utilizes the pressure of the coolant system 42 of the processing machine 22 to actuate the idler assembly 36. Particularly, the pressurized coolant is utilize as a hydraulic fluid to actuate the idler assembly 36. Such actuation is preferably under control of the computer 28 through opening of the valve 48. Closing of the valve 48 under control of the computer of the idler assembly 36.

The processing system 20 further has a wheel assembly magazine 24 that is operative, adapted and/or configured to retain, release and/or store the plurality of wheel assemblies $30_a$ through $30_N$ including the wheel assembly 30 if necessary. The wheel assembly magazine 24 moves as indicated by the arrow from a stowed position to a use position. Preferably and particularly, the wheel assembly magazine 24 moves automatically under control of the computer 28. The wheel assembly magazine 24 allows the loading and unloading of wheel assemblies 30 by the wheel assembly exchanger 26. The wheel assembly exchanger 26 is preferably and particularly automatically controlled via the computer 28. The computer 28 is, of course, operative to execute program instructions (i.e. software) to operate the processing system 20. The program instructions may be stored locally or accessible via a network or the like. The computer 28 also accepts program instruction changes.

The wheel assembly magazine 24 is shown having a plurality of wheel assemblies $30_a$, $30_b$ through $30_N$ some of which utilize the principles of the subject invention and some of which do not. Each wheel assembly has it own respective wheel $32_a$, $32_b$ through $32_N$ and manifold $34_a$, $34_b$ through $34_N$. In this illustration, the wheel assembly $30_b$ utilizes the principles of the subject invention and thus includes an idler assembly $36_b$ and a processing belt $38_b$. It should be appreciated that from one to any number of wheel assemblies may utilize the principles of the subject invention. The wheel assembly magazine 24 also preferably moves as indicated by the double-headed arrow 31 under control of the computer 28. Typically, the wheel assembly magazine 24 is positioned to allow the wheel assembly exchanger 26 to remove a wheel assembly from the motor 23 if one is present, and insert a wheel assembly from the wheel assembly magazine 24 into the motor 23. In all cases, the respective manifold 34 is releasably coupled to the processing device 22 by a quick disconnect type connector.

Figure 2:
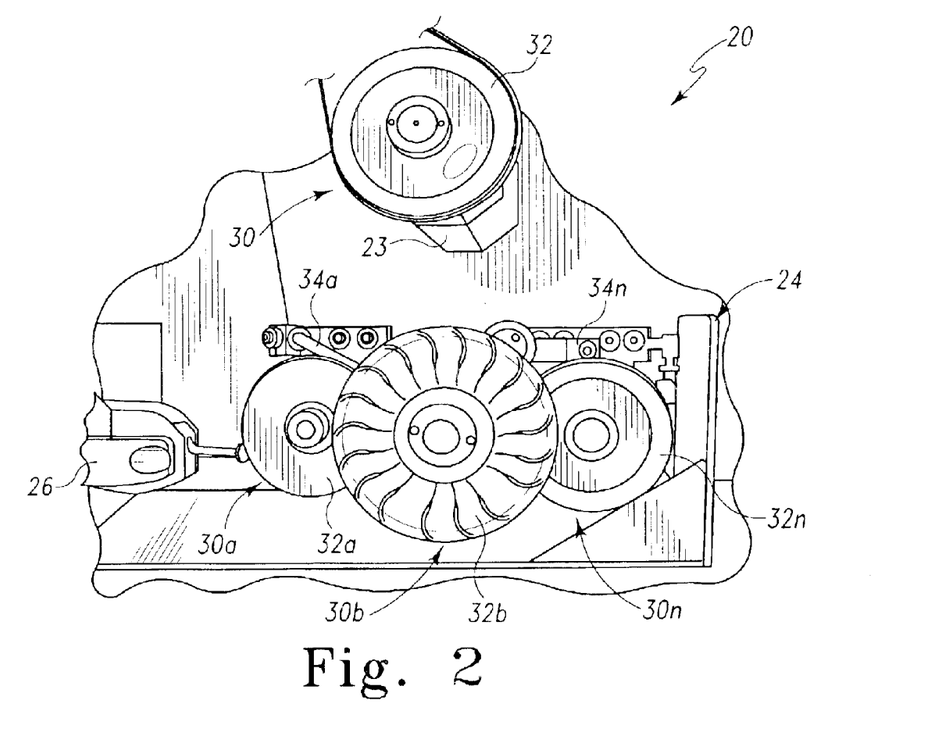
FIG. 2 is a front perspective view of the processing machine of FIG. 1.

Referring now to FIG. 2, there is depicted an exemplary embodiment of the subject invention. Particularly, a portion of the processing system 20 is shown. The motor 23 is suspended from the ceiling or other structure for operating on a prosthetic component. The wheel assembly 30 in accordance with the principles of the subject invention is shown retained by the motor 23. The wheel assembly magazine 24 is shown in an extended position with its various wheel assemblies $30_a$, $30_b$ through $30_N$. Such an exemplary processing machine is manufactured by Schüte of Germany.

Figure 3:
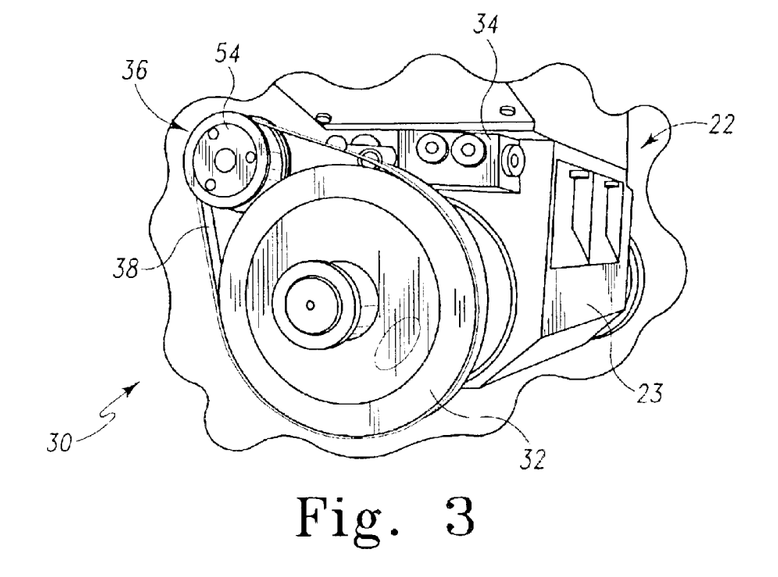
FIG. 3 is an enlarged front perspective view of the motor assembly of the processing machine of FIG. 1 with the present idler assembly and wheel operatively coupled to the motor assembly.

In FIG. 3, there is depicted a close-up of the wheel assembly 30 in accordance with the principles of the subject invention retained in the processing machine 22 and particularly by the motor 23. Portions of the idler assembly 36 can be seen adjacent the wheel 32. Particularly, an idler or idler wheel 54 is depicted as well as the manifold 34. The processing belt 38 is shown operatively situated around the idler 54 and the wheel 32. The processing belt 38 is shown in an untensioned state. FIG. 3 thus provides a depiction of the wheel assembly 30 including the present idler assembly 36 releasably retained by the motor 23/processing machine 22.

Figure 4:
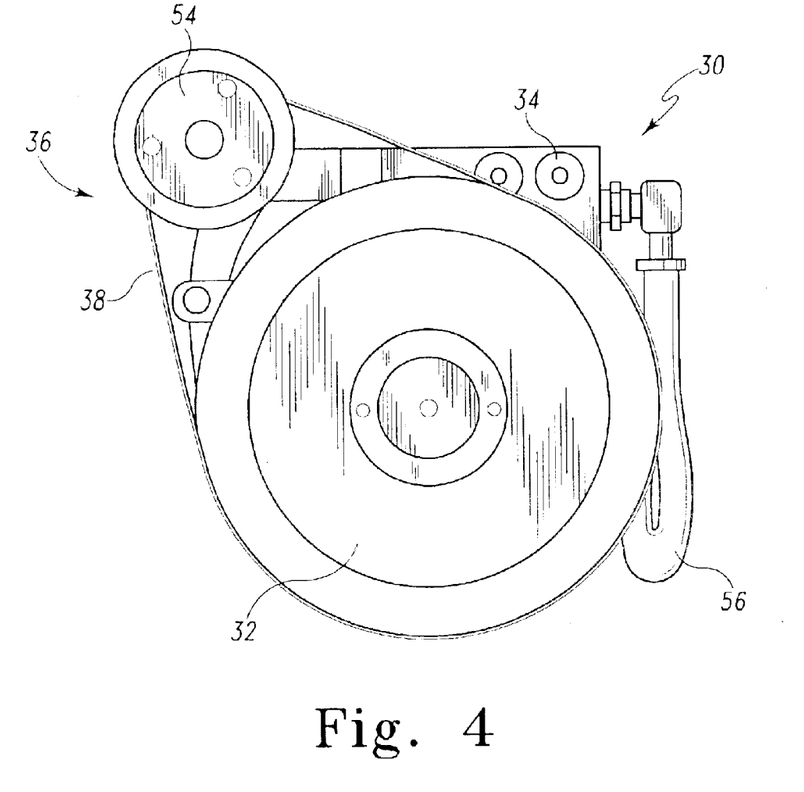
FIG. 4 is an enlarged front perspective view of the idler assembly and wheel of FIG. 3.

In FIG. 4 there is depicted another view of the idler assembly 36 with the processing belt 38 in a tensioned state. In this state, the idler 54 is caused to move away from the wheel 32. This, in turn, provides tension on the processing belt 38. In the tensioned state, the processing machine 22 is operative to process a prosthetic component. A conduit or hose 56 is provided from the manifold 34 to a hydraulic cylinder (see, e.g., FIG. 6). The conduit 56 provides pressurized coolant (fluid) to the hydraulic cylinder which then actuates the idler wheel 54. Particularly, when the valve 48 is actuated, pressurized coolant flows to the manifold 34, through the conduit 56 and into the hydraulic cylinder. The hydraulic cylinder is attached to the idler 54 via an idler arm such that the idler 54 moves away from the wheel 32 to provide belt tensioning. When the pressurized coolant flow ceases, the hydraulic cylinder ceases to move the idler 54 and the idler 54 returns to the rest state wherein the processing belt 38 is untensioned.

Figure 5:
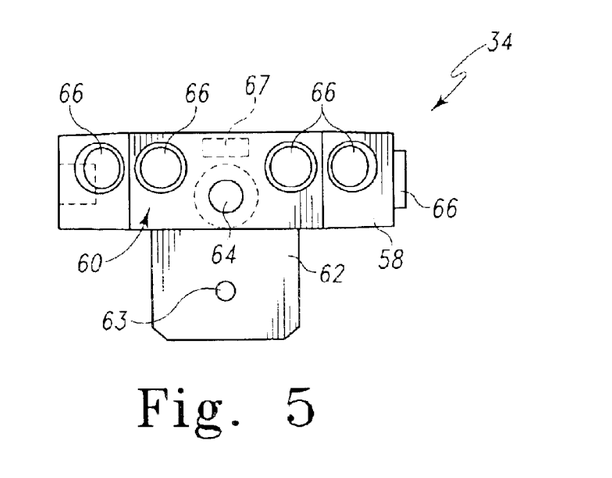
FIG. 5 is a front perspective view of a coolant manifold of the present idler assembly.

Referring now to FIG. 5, there is depicted an exemplary embodiment of a manifold 34. The manifold 34 is operative, adapted and/or configured to be releasably coupled to the processing machine 22 and, more particularly, to the coolant system 42 of the processing machine 22. The manifold 34 is further operative, adapted and/or configured to distribute pressurized coolant from the coolant system 42.

The manifold 34 is characterized by a body 58 having an internal cavity, chamber, or the like 60. A mounting flange 62 extends from the body 58 and is adapted to receive a hydraulic cylinder retention arm (see, e.g., FIGS. 6–8). As such, the mounting flange 62 includes a mounting bore 63 for receiving a fastener for holding the retention arm. A pivot bore or pivot point 64 is also provided in the body 58. The pivot bore/point 64 is configured to receive a pivot fastener of a pivot arm (see, e.g. FIGS. 6–8) and provide a pivot around which the pivot arm pivots. As explained further below, the pivot arm 68 is coupled to the idler 54 and allows the movement of the idler 54 in response to actuation of the hydraulic cylinder 72. The body 58 further includes a plurality of outlets 66 to which various items may be coupled. The manifold 34 further includes a quick release connector or similar connector 67 that is adapted to releasably connect the manifold to the processing machine 22 and provide communication between the manifold 34 (manifold cavity 66) and the coolant system 42.

Figure 6:
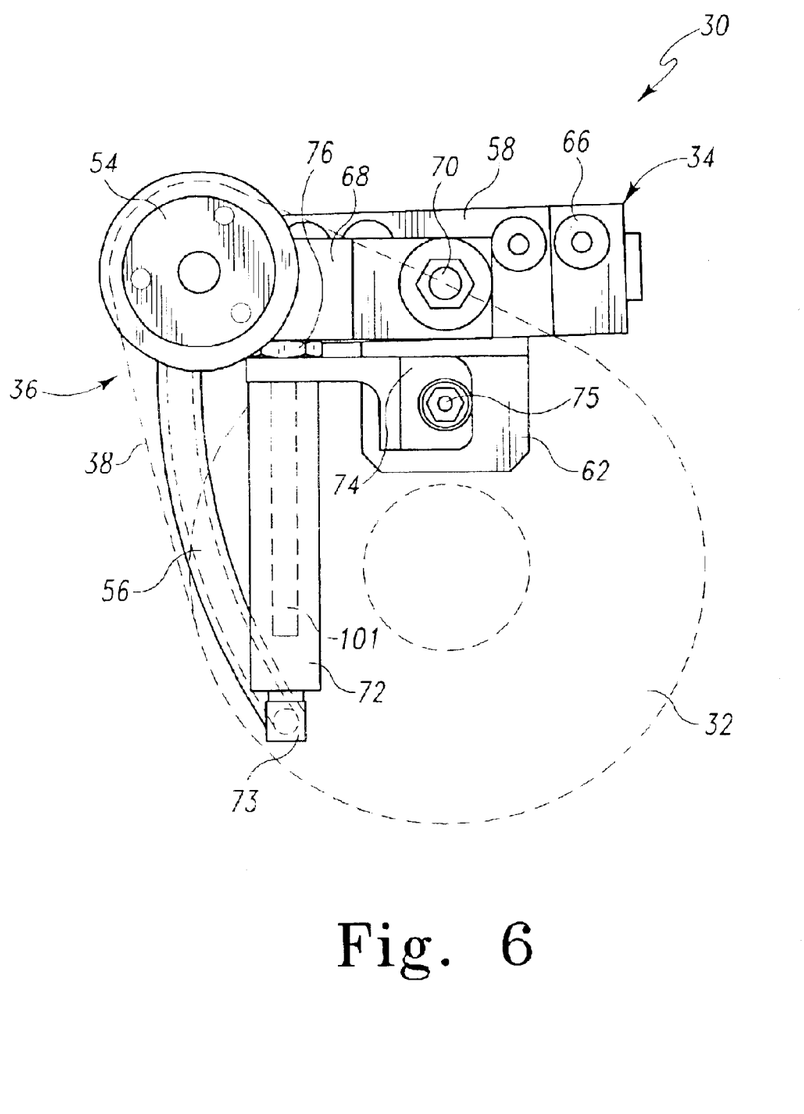
FIG. 6 is a front plan view of one embodiment the present idler assembly in accordance with the principles presented herein.
Figure 7:
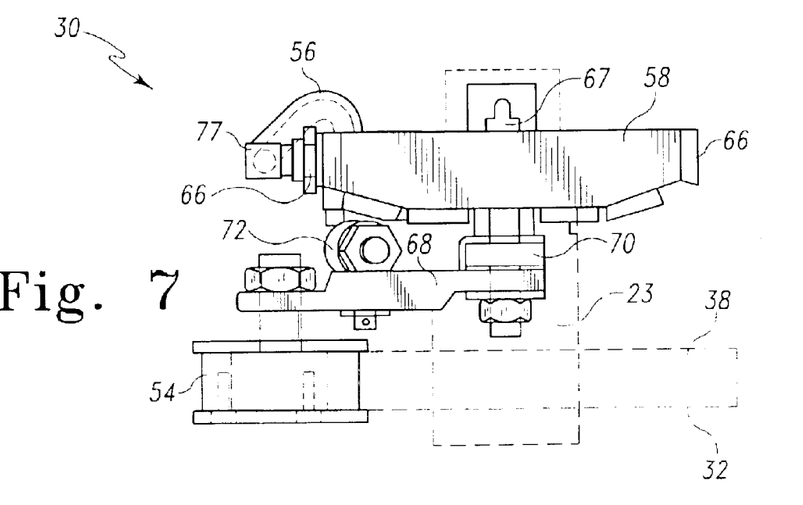
FIG. 7 is a top plan view of the idler assembly of FIG. 6.
Figure 8:
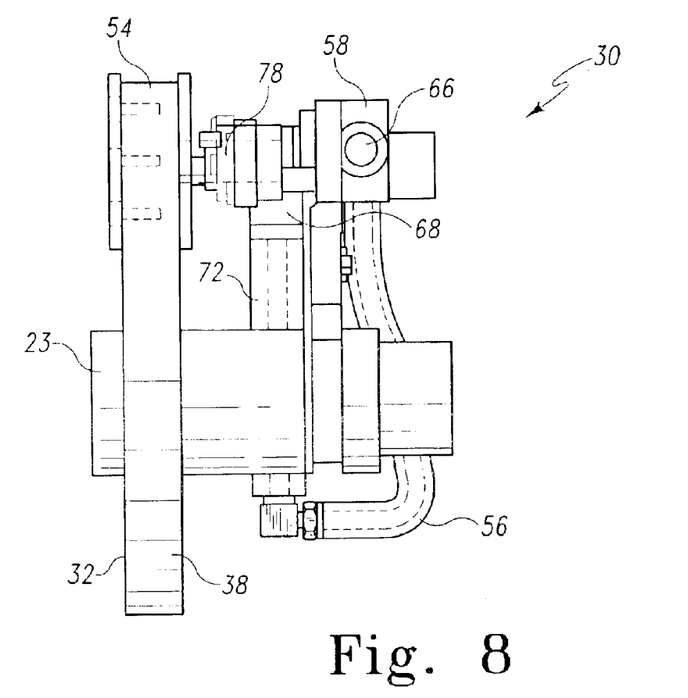
FIG. 8 is a left side plan view of the idler assembly of FIG. 6.

Referring now to FIGS. 6–8, the wheel assembly 30 is shown with greater particularity. The wheel assembly 30 includes the wheel 32 and the idler assembly 36. The idler assembly 36 includes the manifold 34, the idler or idler wheel 54, a hydraulic cylinder 72, an idler pivot arm 68 and a conduit 56. The hydraulic cylinder 72 is fixed in position relative to the idler 54 by a hydraulic cylinder bracket or the like 74. The hydraulic cylinder bracket 74 is fixed to the flange 62 of the manifold 34 by a fastener 75. The hydraulic bracket 74 maintains the hydraulic cylinder 72 in a fixed position.

The idler 54 is mounted for rotation on an idler/pivot arm 68 that extends from the manifold 34. Particularly, the arm 68 is pivotally coupled to the manifold at the pivot point 63 via a pivot fastener 70. The arm 68 allows the idler 54 to move with and in response to the hydraulic cylinder 72 both in a tensioned state or mode and an untensioned state or mode. FIGS. 6–8 depict the idler 54 in an untensioned state or mode. The conduit 56 is coupled to the manifold 34 via a connector 77 and to the hydraulic cylinder 72 via connector 73. The conduit 56 provides communication between the manifold 34 and the hydraulic cylinder 72. Particularly, the conduit 56 provides pressurized coolant from the manifold 34 to the hydraulic cylinder 72 for actuation of the hydraulic cylinder 72.

Figure 9:
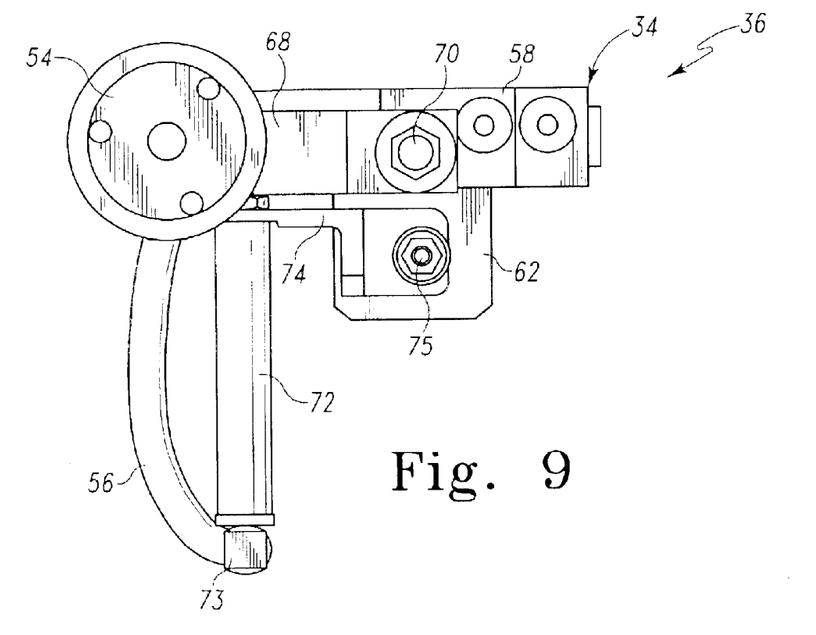
FIG. 9 is a perspective view of the idler assembly of FIG. 6 in a rest, unactuated or unpressurized mode or state.
Figure 10:
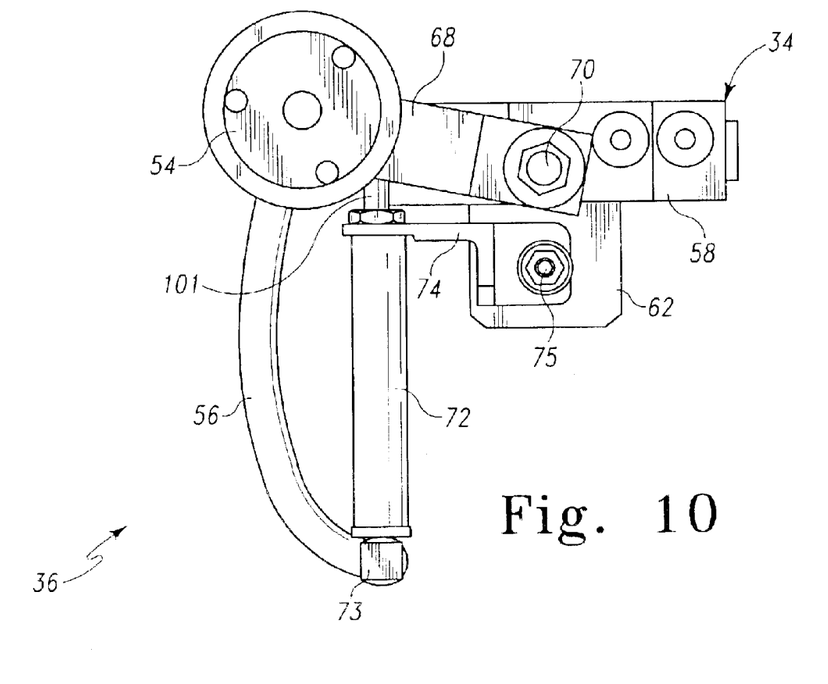
FIG. 10 is a perspective view of the idler assembly of FIG. 9 in an active, actuated or pressurized mode or state.

Referring now to FIGS. 9 and 10, the states or modes of the idler assembly 36 will be described. As indicated above, the idler assembly 36 is utilized by a wheel assembly, such as the wheel assembly 30, that has a processing belt, such as the processing belt 38. The idler assembly 36 of FIG. 9 is in an unactuated, untensioned, or idle state or mode. In the position of FIG. 9, when the idler assembly 36 is mounted onto the wheel assembly, the idler 54 is proximate the wheel 32. Since the belt 38 is positioned around the idler 54 and the wheel 32, the belt 38 is untensioned, relaxed, slack, loose or the like when the idler 54 is in the position proximate the wheel 32.

The idler assembly of FIG. 10 is in an actuated, tensioned, or running state or mode. In the position of FIG. 10, and again when the idler assembly 36 is mounted onto the wheel assembly, the idler 54 has moved away from the wheel 32. Again, since the belt 38 is positioned around the idler 54 and the wheel 32, the belt 38 is tensioned, taut, stretched or the like when the idler 54 is in the position distal the wheel 32.

The idler 54 is caused to be extended into the distal position thereof upon actuation of the hydraulic cylinder 72. As depicted in FIG. 10, when the hydraulic cylinder 72 is actuated, its shaft 101, which is connected to the idler 54 and/or the pivot arm 68, exerts a force against the idler and/or arm. This force causes the arm 68 to pivot slightly about the pivot point 70. This slight pivot movement provides tension to the belt 38 situated about the idler 54.

Actuation of the hydraulic cylinder 72 is via introduction of pressurized coolant provided to the hydraulic cylinder via the conduit 56. The conduit 56 is in fluid communication with the manifold 34 which is, in turn, in fluid communication with the coolant system 42. Actuation of the valve 48 of the coolant system 42 allows system coolant under pressure to be introduced into the manifold 34. Introduction of pressured coolant into the manifold 34 introduces coolant into the conduit 56 and thus the hydraulic cylinder 72. The hydraulic cylinder 72 forces movement of the arm 68 and thus the idler 54 into the tensioned position as depicted in FIG. 10. When the valve 48 is closed, pressurized coolant does not flow to the hydraulic cylinder 72. Consequently, the idler 54 returns to the untensioned state.

Figure 11:
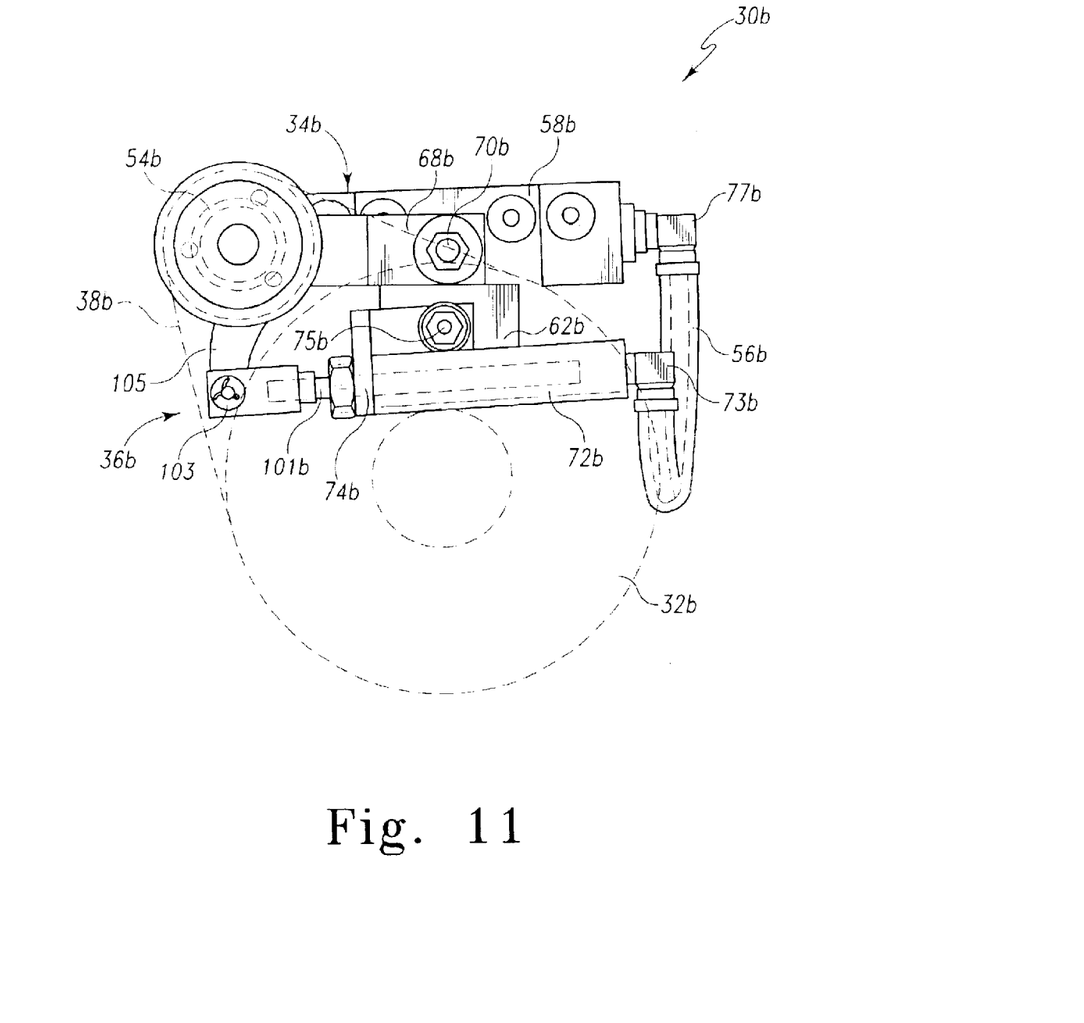
FIG. 11 is a front plan view of another embodiment of an idler assembly in accordance with the principles presented herein.

With reference now to FIG. 11, there is depicted another embodiment of an idler assembly, generally designated 36b of the wheel assembly 30b. The idler assembly 30b embodiment of FIG. 11 may be referred to as a right hand embodiment, while the idler assembly 30 embodiment of FIG. 6 may be considered a left hand embodiment. The idler assembly 36b of FIG. 11 includes a manifold 34b, an idler or idler wheel 54b, a hydraulic cylinder 72b, an idler pivot arm 68b and a conduit 56b. The hydraulic cylinder 72b is fixed in position relative to the idler 54b by a hydraulic cylinder bracket or the like 74b. The hydraulic cylinder bracket 74b is fixed to the flange 62b of the manifold 34b by a fastener 75b. The hydraulic bracket 74b maintains the hydraulic cylinder 72b in a fixed position.

The idler 54b is mounted for rotation on an idler/pivot arm 68b that extends from the manifold 34b. Particularly, the arm 68b is pivotally coupled to the manifold at the pivot point via a pivot fastener 70b. The arm 68b allows the idler 54b to move with and in response to the hydraulic cylinder 72b both in a tensioned state or mode and an untensioned state or mode. The rod 101b of the hydraulic cylinder 72b terminates in a head 103 that is coupled to the idler 54b through a connector 105.

FIG. 11 depicts the idler 54b in an untensioned state or mode. The conduit 56b is coupled to the manifold 34b via a connector 77b and to the hydraulic cylinder 72b via connector 73b. The conduit 56b provides fluid communication between the manifold 34b and the hydraulic cylinder 72b. Particularly, the conduit 56b provides pressurized coolant from the manifold 34b to the hydraulic cylinder 72b for actuation of the hydraulic cylinder 72b. Actuation of the hydraulic cylinder 72b pivots the arm 68b which translates the idler 54b into a position distal of the wheel 32b such that tensioning of the belt 38b is provided.

Figure 12:
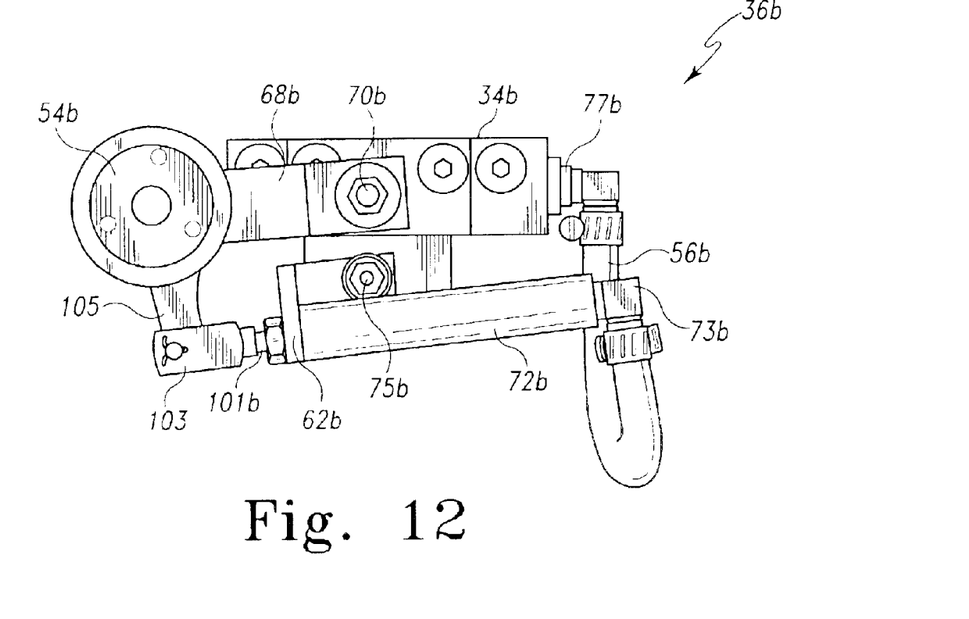
FIG. 12 is a perspective view of the idler assembly of FIG. 11 in a rest, unactuated or unpressurized mode or state.
Figure 13:
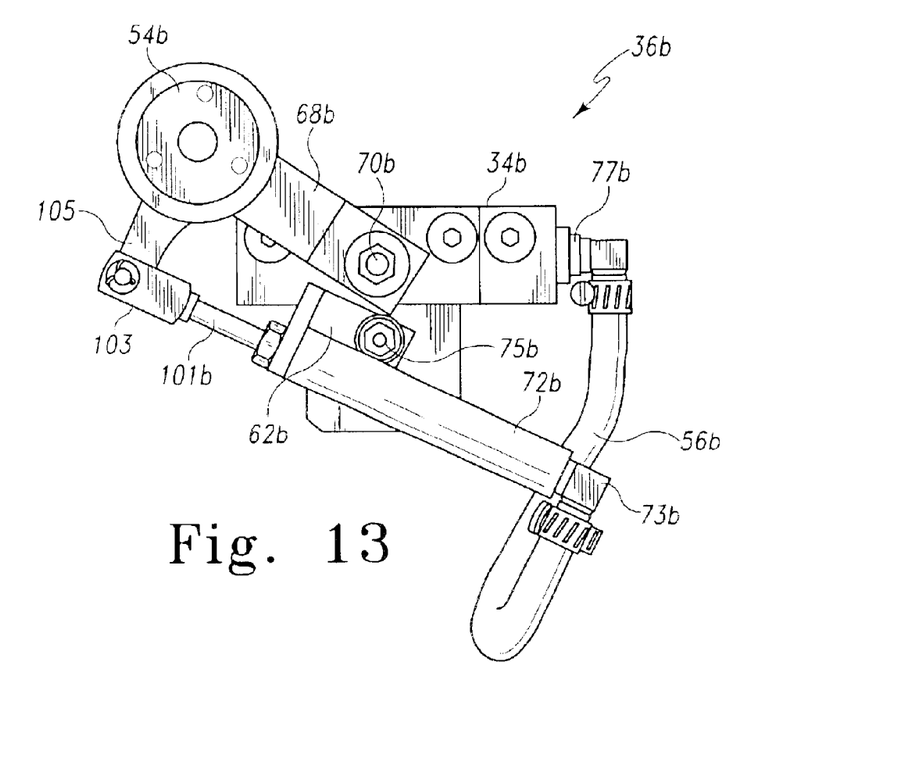
FIG. 13 is a perspective view of the idler assembly of FIG. 12 in an active, actuated or pressurized mode or state.

Referring now to FIGS. 12 and 13, the states or modes of the idler assembly 36a will be described. As indicated above, the idler assembly 36b is utilized by a wheel assembly, such as the wheel assembly 30b, that has a processing belt, such as the processing belt 38b. The idler assembly 36b of FIG. 12 is in an unactuated, untensioned, or idle state or mode. In the position of FIG. 12, when the idler assembly 36b is mounted onto the wheel assembly, the idler 54b is proximate the wheel 32b. Since the belt 38b is positioned around the idler 54b and the wheel 32b, the belt 38b is untensioned, relaxed, slack, loose or the like when the idler 54b is in the position proximate the wheel 32b.

The idler assembly of FIG. 13 is in an actuated, tensioned, or running state or mode. In the position of FIG. 13, and again when the idler assembly 36b is mounted onto the wheel assembly, the idler 54b has moved away from the wheel 32b. Again, since the belt 38b is positioned around the idler 54b and the wheel 32b, the belt 38b is tensioned, taut, stretched or the like when the idler 54b is in the position distal the wheel 32b.

The idler 54b is caused to be extended into the distal position thereof upon actuation of the hydraulic cylinder 72b. As depicted in FIG. 13, when the hydraulic cylinder 72b is actuated, its shaft 101b, which is connected to the idler 54b and/or the pivot arm 68b via head 103 and connector 105, exerts a force against the idler and/or arm. This force causes the arm 68b to pivot slightly about the pivot point 70b. This slight pivot movement provides tension to the belt 38b situated about the idler 54b.

Actuation of the hydraulic cylinder 72b is via introduction of pressurized coolant provided to the hydraulic cylinder via the conduit 56b. The conduit 56b is in fluid communication with the manifold 34b which is, in turn, in fluid communication with the coolant system 42. Actuation of the valve 48 of the coolant system 42 allows system coolant under pressure to be introduced into the manifold 34b. Introduction of pressured coolant into the manifold 34b introduces coolant into the conduit 56b and thus the hydraulic cylinder 72b. The hydraulic cylinder 72b forces movement of the arm 68b and thus the idler 54b into the tensioned position as depicted in FIG. 13. When the valve 48 is closed, pressurized coolant does not flow to the hydraulic cylinder 72b. Consequently, the idler 54b returns to the untensioned state.

There is a plurality of advantages of the subject invention arising from the various features of the idle assembly described herein. It will be noted that alternative embodiments of the idler assembly/wheel assembly of the subject invention may not include all of the features described yet still benefit from at least some of the advantages of such features. Those of ordinary skill in the art may readily devise their own implementations of an idler assembly that incorporate one or more of the features of the subject invention and fall within the sprit and scope of the subject invention.

What is claimed is:

1. A tensioning assembly for providing releasable tensioning to a processing belt associated with a wheel assembly of a processing machine, the idler assembly comprising:
   a fluid distributor adapted to be releasably coupled to a coolant system of the processing machine; the coolant system operative to selectively provide coolant to said fluid distributor;

an idler arm pivotally attached at a first end thereof to said fluid distributor;

an idler coupled for rotation to a second end of said idler arm; an actuator operatively coupled to said idler arm; and a fluid conduit in fluid communication between said fluid distributor and said actuator;

said actuator having a first mode of operation wherein said idler provides an untensioned state to the processing belt, said first mode of operation corresponding to absence of coolant being provided to said actuator from said fluid distributor via said fluid conduit, and having a second mode of operation wherein said idler provides a tensioned state to the processing belt, said second mode of operation corresponding to provision of coolant to said actuator from said fluid distributor via said fluid conduit whereby said actuator causes said idler arm to pivot moving said idler against the processing belt.

2. The idler assembly of claim 1, wherein said idler comprises a wheel.

3. The idler assembly of claim 1, wherein said fluid distributor is a manifold.

4. The idler assembly of claim 3, wherein said manifold includes a quick disconnect operative to provide releasable connectivity for said manifold and fluid communication between said manifold and the coolant system of the processing machine.

5. The idler assembly of claim 1, wherein said actuator comprises a hydraulic cylinder.

6. An idler assembly for providing tensioning to a processing belt of a wheel assembly of a processing machine, the idler assembly comprising:

a manifold defining a body having an internal cavity, an outlet in fluid communication with said internal cavity, an inlet in fluid communication with said internal cavity, and a quick disconnect disposed at said inlet, said quick disconnect operative to allow said manifold and the idler assembly to be releasably attached to the processing machine and be in releasable fluid communication with a valved coolant system of the processing machine, the valved coolant system operative to selectively provide processing machine system coolant to said manifold;

an idler;

an idler arm pivotally coupled at a first end to said manifold and coupled at a second end to said idler;

an actuator coupled to said idler arm; and a conduit coupled to said outlet of said manifold and said actuator and providing fluid communication between said manifold and said actuator;

said actuator having a first state corresponding to the absence of coolant being provided to said manifold in response to non-activation of the valved coolant system wherein said idler via said idler arm is in an untensioned state with regard to the processing belt, and a second state corresponding to coolant being provided to said manifold in response to activation of the valved coolant system wherein said idler via said idler arm is in a tensioned state with regard to the process belt.

7. The idler assembly of claim 6, wherein said actuator is a hydraulic cylinder.

8. The idler assembly of claim 7, wherein said hydraulic cylinder includes a cylinder rod that is longitudinally movable in response to actuation of said hydraulic cylinder, said cylinder rod coupling said hydraulic cylinder to said idler arm.

9. The idler assembly of claim 6, wherein said idler is rotatably mounted to said idler arm.

10. The idler assembly of claim 6, wherein said valved coolant system is operative to selectively provide processing machine system coolant to said manifold in response to a valve control signal.

11. The idler assembly of claim 10, wherein said valve control signal is provided under computer control.

12. A wheel assembly for coupling to a processing machine, the wheel assembly comprising:

a rotatable processing wheel;

a processing belt situated around said processing wheel and adapted to rotate with said processing wheel when the processing belt is tensioned;

a manifold defining a body having an internal cavity, an outlet in fluid communication with said internal cavity, an inlet in fluid communication with said internal cavity, and a quick disconnect disposed at said inlet, said quick disconnect operative to allow said manifold and the wheel assembly to be releasably attached to the processing machine and be in releasable fluid communication with a valved coolant system of the processing machine, the valved coolant system operative to selectively provide processing machine system coolant to said manifold;

an idler, said idler having the processing belt situated therearound for rotation of the processing belt with said wheel when the processing belt is tensioned;

an idler arm pivotally coupled at a first end to said manifold and coupled at a second end to said idler;

an actuator coupled to said idler arm; and a conduit coupled to said outlet of said manifold and said actuator and providing fluid communication between said manifold and said actuator;

said actuator having a first state corresponding to the absence of coolant being provided to said manifold in response to non-activation of the valved coolant system wherein said idler via said idler arm is in an untensioned state with regard to the processing belt, and a second state corresponding to coolant being provided to said manifold in response to activation of the valved coolant system wherein said idler via said idler arm is in a tensioned state with regard to the process belt.

13. The wheel assembly of claim 12, wherein said actuator is a hydraulic cylinder.

14. The wheel assembly of claim 13, wherein said hydraulic cylinder includes a cylinder rod that is longitudinally movable in response to actuation of said hydraulic cylinder, said cylinder rod coupling said hydraulic cylinder to said idler arm.

15. The wheel assembly of claim 12, wherein said idler is rotatably mounted to said idler arm.

16. The wheel assembly of claim 12, wherein said valved coolant system is operative to selectively provide processing machine system coolant to said manifold in response to a valve control signal.

17. The wheel assembly of claim 16, wherein said valve control signal is provided under computer control.

* * * * *